(12) United States Patent
Popovic et al.

(10) Patent No.: US 12,451,663 B2
(45) Date of Patent: Oct. 21, 2025

(54) MULTI-WAVELENGTH LASER SYSTEM FOR OPTICAL DATA COMMUNICATION LINKS AND ASSOCIATED METHODS

(71) Applicant: Ayar Labs, Inc., Santa Clara, CA (US)

(72) Inventors: Milos Popovic, San Francisco, CA (US); Rajeev Ram, San Francisco, CA (US); Vladimir Stojanovic, Berkeley, CA (US); Chen Sun, Berkeley, CA (US); Mark Taylor Wade, Berkeley, CA (US); Alexandra Carroll Wright, Oakland, CA (US)

(73) Assignee: Ayar Labs, Inc., San Jose, CA (US)

( * ) Notice: Subject to any disclaimer, the term of this patent is extended or adjusted under 35 U.S.C. 154(b) by 19 days.

(21) Appl. No.: 18/337,362

(22) Filed: Jun. 19, 2023

(65) Prior Publication Data

US 2023/0352897 A1 Nov. 2, 2023

Related U.S. Application Data

(63) Continuation of application No. 17/582,814, filed on Jan. 24, 2022, now Pat. No. 11,682,879, which is a
(Continued)

(51) Int. Cl.
*H01S 3/08* (2023.01)
*H01S 3/00* (2006.01)
(Continued)

(52) U.S. Cl.
CPC ......... *H01S 3/08086* (2013.01); *H01S 3/005* (2013.01); *H01S 3/0405* (2013.01);
(Continued)

(58) Field of Classification Search
CPC .... H01S 3/08086; H01S 3/005; H01S 3/0405; H01S 3/2391; H04B 10/25; H04B 10/40;
(Continued)

(56) References Cited

U.S. PATENT DOCUMENTS

7,565,084 B1 * 7/2009 Wach ............... H04J 14/04
398/201
8,965,203 B1 * 2/2015 Vahdat ............. H04J 14/0282
398/79
(Continued)

*Primary Examiner* — Hibret A Woldekidan
(74) *Attorney, Agent, or Firm* — Penilla IP, APC (57) ABSTRACT

A laser light generator is configured to generate one or more wavelengths of continuous wave laser light. The laser light generator is configured to collectively and simultaneously transmit each of the wavelengths of continuous wave laser light through an optical output of the laser light generator as a laser light supply. An optical fiber is connected to receive the laser light supply from the optical output of the laser light generator. An optical distribution network has an optical input connected to receive the laser light supply from the optical fiber. The optical distribution network is configured to transmit the laser light supply to each of one or more optical transceivers and/or optical sensors. The laser light generator is physically separate from each of the one or more optical transceivers and/or optical sensors.

9 Claims, 8 Drawing Sheets

Related U.S. Application Data continuation of application No. 16/777,003, filed on Jan. 30, 2020, now Pat. No. 11,233,371, which is a continuation of application No. 16/195,829, filed on Nov. 19, 2018, now Pat. No. 10,581,215, which is a continuation of application No. 15/277,968, filed on Sep. 27, 2016, now Pat. No. 10,135,218.

(60) Provisional application No. 62/236,384, filed on Oct. 2, 2015.

(51) Int. Cl.
| | | |
|---|---|---|
| *H01S 3/04* | (2006.01) | |
| *H01S 3/23* | (2006.01) | |
| *H04B 10/25* | (2013.01) | |
| *H04B 10/40* | (2013.01) | |
| *H04B 10/50* | (2013.01) | |
| *H04B 10/572* | (2013.01) | |
| *H04J 14/02* | (2006.01) | |

(52) U.S. Cl.
CPC ........... *H01S 3/2391* (2013.01); *H04B 10/25* (2013.01); *H04B 10/40* (2013.01); *H04B 10/503* (2013.01); *H04B 10/506* (2013.01); *H04B 10/572* (2013.01); *H04J 14/025* (2013.01); *H04J 2014/0253* (2013.01); *H04J 14/0282* (2013.01)

(58) Field of Classification Search
CPC .. H04B 10/503; H04B 10/506; H04B 10/572; H04J 14/02; H04J 14/025; H04J 14/0282; H04J 2014/0253; H04J 14/03; H04J 14/0278

See application file for complete search history.

(56) References Cited

U.S. PATENT DOCUMENTS

2004/0141747 A1* 7/2004 Kenny ............... H04N 21/6118
398/71
2014/0374602 A1* 12/2014 Falcone ................ H05B 47/13
250/341.1

* cited by examiner

MULTI-WAVELENGTH LASER SYSTEM FOR OPTICAL DATA COMMUNICATION LINKS AND ASSOCIATED METHODS

CLAIM OF PRIORITY

This application is a continuation application under 35 U.S.C. 120 of prior U.S. application Ser. No. 17/582,814, filed Jan. 24, 2022, which is a continuation application under 35 U.S.C. 120 of prior U.S. application Ser. No. 16/777,003, filed Jan. 30, 2020, issued as U.S. Pat. No. 11,233,371, on Jan. 25, 2022, which is a continuation application under 35 U.S.C. 120 of prior U.S. application Ser. No. 16/195,829, filed Nov. 19, 2018, issued as U.S. Pat. No. 10,581,215, on Mar. 3, 2020, which is a continuation application under 35 U.S.C. 120 of prior U.S. application Ser. No. 15/277,968, filed Sep. 27, 2016, issued as U.S. Pat. No. 10,135,218, on Nov. 20, 2018, which claims priority under 35 U.S.C. 119 (e) to U.S. Provisional Patent Application No. 62/236,384, filed Oct. 2, 2015. The disclosure of each above-identified patent application is incorporated herein by reference in its entirety for all purposes.

BACKGROUND

1. Field of the Invention

The present invention relates to fiber-optic data communication.

2. Description of the Related Art

Figure 1A:
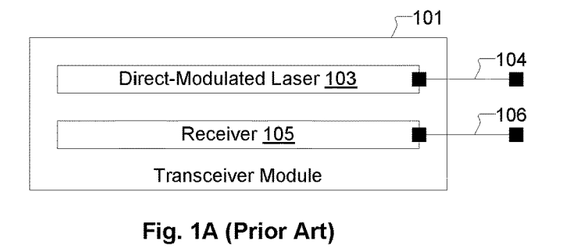
FIG. 1A shows a transceiver module having a direct-modulated laser configuration.

Multi-mode optical communication standards, such as the 100G-SR4 standard of IEEE 802.3, rely upon direct-modulated laser sources that are integrated within the transceiver module. For example, FIG. 1A shows a transceiver module 101 having a direct-modulated laser 103 integrated therein. The direct-modulated laser 103 is turned on and off to produce an on-off keyed light transmission at an output 104. The transceiver module 101 also includes a receiver module 105 configured to receive an encoded light transmission at an input 106 for decoding. It should be understood that the direct-modulated laser 103 is implemented directly and physically within the transceiver module 101.

Figure 1B:
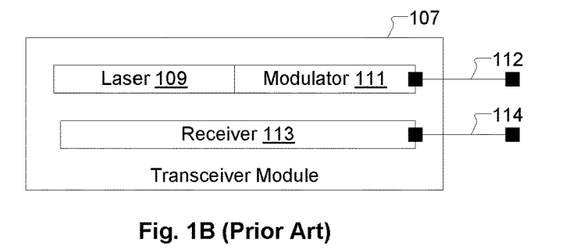
FIG. 1B shows a transceiver module having an indirect-modulated laser configuration.

Single-mode optical communication typically uses an indirect modulation scheme (though direct modulation is also possible) in which continuous wave light generated by a laser is modulated by a modulator. For example, FIG. 1B shows a transceiver module 107 having an indirect-modulated laser configuration in which a laser light source 109 within the transceiver module 107 produces continuous wave light that is modulated by an independent modulator 111 within the transceiver module 107 to generate a light stream of encoded data for transmission at an output 112 of the transceiver module 107. The transceiver module also includes a receiver module 113 configured to receive an encoded light transmission at an input 114 for decoding. It should be understood that the laser light source 109 is implemented directly and physically within the transceiver module 107.

Figure 1C:
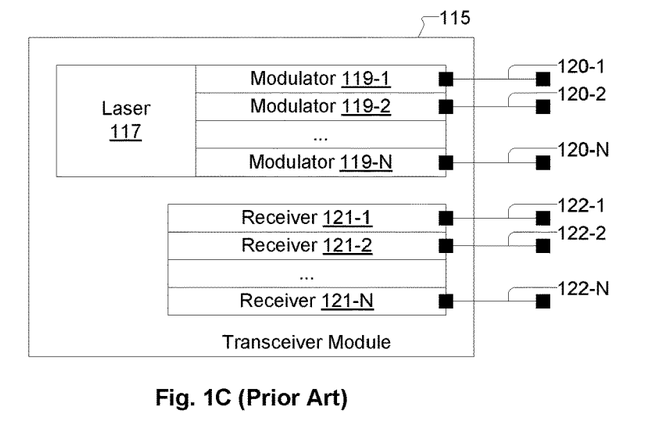
FIG. 1C shows a laser light source connected to provide laser light to multiple transceivers within a transceiver module.

In some configurations, a laser light source is shared across multiple transceivers within the same transceiver module, where transmitters of the multiple transceivers transmit at the same wavelength of light, such as in accordance with optical communication specification 100G-PSM4 of the parallel single mode 4-lane multi-source agreement (PSM4 MSA) group. For example, FIG. 1C shows a laser light source 117 connected to provide laser light to multiple transceivers within a transceiver module 115. The multiple transceivers are defined by multiple modulators 119-1 to 119-N and multiple receiver modules 121-1 to 121-N. The multiple modulators 119-1 to 119-N are parts of respective transmitter modules configured to generate multiple light streams of encoded data for transmission at respective outputs 120-1 to 120-N of the transceiver module 115. The laser light source 117 supplies continuous wave light to the multiple independent modulators 119-1 to 119-N within the same transceiver module 115 as the laser light source 117. The multiple receiver modules 121-1 to 121-N are configured to receive encoded light transmissions at respective inputs 122-1 to 122-N for decoding. It should be understood that the laser light source 117 is implemented directly and physically within the transceiver module 115.

Figure 1D:
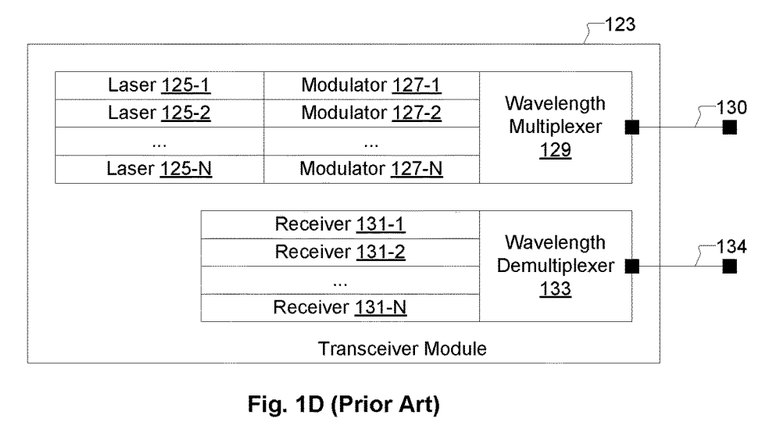
FIG. 1D shows a transceiver module for WDM optical data communication.

Wavelength division multiplexing (WDM) has been proposed to scale bandwidth per optical fiber in fiber-optic data communication systems, such as in accordance with optical communication standard 100G-LR4 of IEEE 802.3). FIG. 1D shows a transceiver module 123 for WDM optical data communication in which multiple laser light sources 125-1 to 125-N are implemented to respectively supply continuous wave light of different wavelengths to multiple modulators 127-1 to 127-N of corresponding multiple transmitters. Each of the multiple modulators 127-1 to 127-N is configured to generate a respective light stream of encoded data based on the wavelength of the continuous wave light that it receives from its corresponding laser light source 125-1 to 125-N. The multiple light streams of encoded data output by the multiple modulators 127-1 to 127-N are multiplexed onto a single optical fiber in accordance with the WDM optical data communication standard by a wavelength multiplexer 129 for transmission at an output 130 of the transceiver module 123. The multiple transmitters within the transceiver module 123 also include multiple receiver modules 131-1 to 131-N configured to receive encoded light transmissions for decoding from a wavelength demultiplexer 133. The wavelength demultiplexer 133 is configured to receive a transmission of multiple light streams of encoded data that have been multiplexed onto a single optical fiber in accordance with the WDM optical data communication standard at an input 134, and supply separate ones of the multiple light streams of encoded data to corresponding ones of the multiple receiver modules 131-1 to 131-N for decoding. It should be understood that the multiple laser light sources 125-1 to 125-N are implemented directly and physically within the transceiver module 123.

The laser light sources used for WDM optical data communication require precise temperature control due to wavelength drift of the laser light sources with variation in temperature and due to the close spacing of the optical wavelength channels as defined by the WDM optical communication standard. Such precise temperature control can be costly, bulky, and power-consuming. Therefore, WDM optical data communication using multiple laser light sources with precise temperature control can be undesirable for shorter reach communication networks such as the networks present in data centers. Coarse wavelength division multiplexing (CWDM) optical data communication, such as in accordance with optical communication specification 100G-CWDM4 of the coarse wavelength division multiplexing 4-lane multi-source agreement (CWDM4 MSA) group, relaxes the wavelength channel spacing requirements in order to simplify the thermal control of the multiple laser light sources.

Both WDM and CDWM use multiple laser light sources that are directly and physically implemented within the transceiver module to generate the set of wavelengths that are needed for the optical data communication. And, typical laser light sources implemented within the transceiver module are configured to output only 5 milliWatts (mW) to 10 mW of power. However, there are several drawbacks to having the laser light sources implemented directly and physically within the transceiver module. For example, one such drawback is difficulty of replacement of the laser light source. Within the optical data communication system, the laser light source is the component that has the shortest mean time to failure. Replacement of a malfunctioning/failed laser light source requires replacement of the entire transceiver module, which is logistically difficult and costly.

Another drawback of having the laser light source implemented directly and physically within the transceiver is that the laser light source, which is a thermally-sensitive component, is exposed to and must tolerate the same range of temperature variation as the other transceiver components. This exacerbates the aforementioned issue regarding precise temperature control of the laser light sources due to wavelength drift caused by variation in temperature. Additionally, when the laser light source is implemented directly and physically within the transceiver, the laser light source is confined within the small form factor of the transceiver which makes thermal dissipation more difficult, thereby lowering the efficiency and reliability of the laser light source.

Another drawback of having the laser light source implemented directly and physically within the transceiver is that the laser light source is operated at relatively low power (enough to power a single link), which can adversely affect wall-plug efficiency. Also, there are form factor and material constraints associated with integration of the laser light source within the transceiver module. Another drawback of having the laser light source implemented directly and physically within the transceiver is that the power budget of the laser light source adds to the power budget of the transceiver module, which compounds the power dissipation problem faced by small form factor transceiver modules.

Also, as disclosed in U.S. Pat. No. 7,715,714, use of a centralized laser power grid having an array of single-wavelength continuous wave laser light sources in a packet-switched optical network has been considered. However, such methods that implement the centralized laser power grid use wavelength-addressable switches to steer continuous wave laser power to specific optical links, which results in an architecture that is significantly different than that of the inventive embodiments disclosed herein with regard to the present invention. It is within this context that the present invention arises.

SUMMARY

In an example embodiment, a laser light supply system for fiber-optic data communication is disclosed. The laser light supply system includes a laser light generator configured to simultaneously generate one or more wavelengths of continuous wave laser light. The laser light generator has an optical output. The laser light generator is configured to transmit each of the one or more wavelengths of continuous wave laser light through the optical output as a laser light supply. The laser light supply system also includes an optical conveyance device connected to receive the laser light supply from the optical output of the laser light generator. The laser light supply system also includes an optical distribution network having an optical input connected to the optical conveyance device to receive the laser light supply from the laser light generator. The optical distribution network is configured to transmit the laser light supply to each of one or more optical transceivers. The laser light generator is physically separate from each of the one or more optical transceivers.

In an example embodiment, a method is disclosed for supplying laser light for fiber-optic data communication. The method includes generating multiple wavelengths of continuous wave laser light at a location physically separate from one or more optical transceivers that utilize the multiple wavelengths of continuous wave laser light for encoding data. The method also includes transmitting each of the multiple wavelengths of continuous wave laser light in a collective and simultaneous manner through an optical distribution network to the one or more optical transceivers. The method also includes receiving the multiple wavelengths of continuous wave laser light at the one or more optical transceivers. The method also includes using one or more of the multiple wavelengths of continuous wave laser light received at the one or more optical transceivers to encode data into one or more data light streams.

In an example embodiment, a laser light supply system for optical sensing is disclosed. The laser light supply system includes a laser light generator configured to simultaneously generate one or more wavelengths of continuous wave laser light. The laser light generator has an optical output. The laser light generator is configured to transmit each of the one or more wavelengths of continuous wave laser light through the optical output as a laser light supply. The laser light supply system includes an optical conveyance device connected to receive the laser light supply from the optical output of the laser light generator. The laser light supply system also includes an optical distribution network having an optical input connected to the optical conveyance device to receive the laser light supply from the laser light generator. The optical distribution network is configured to transmit the laser light supply to each of one or more optical sensors. The laser light generator is physically separate from each of the one or more optical sensors.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Systems and methods are disclosed herein for improving fiber-optic data communication. More specifically, systems and methods are disclosed herein for a high-powered multi-wavelength laser light supply system for use in fiber-optic data communication. Also, various embodiments are disclosed herein for fiber-optic data communication systems and associated methods in which the laser light supply system is implemented separate, i.e., physically separate, from transceivers that use the laser light provided by the laser light supply system. Separation of the transceiver modules from the laser light source has multiple benefits, including decoupling of failure modes, heat management, serviceability, and upgradeability, among others. Another advantage of having the laser light source separate and independent from the transceiver module is the simplicity of the transceiver module's optical package, as no laser alignment step is required in the transceiver module itself, and the optical packaging step for the transceiver module simply requires connection of an optical fiber to the transceiver module's optical input. Additionally, the laser light source outputs continuous wave laser light and does not require an electrical package with high-speed input/output (I/O).

In some embodiments, the laser light supply system disclosed herein is configured to supply continuous wave laser light of multiple wavelengths to multiple dense wavelength division multiplexed (DWDM) optical links in fiber-optic data communication systems. However, it should be understood that in some embodiments, the laser light supply system disclosed here can be used to supply continuous wave laser light of multiple wavelengths to other types of optical links, i.e., to non-DWDM optical links. The continuous wave laser light output by the laser light supply system can be modulated by transmitters within the optical links. And, the modulated light can then be received and processed by receivers of the optical links. The transmitters and receivers together form the transceivers of the optical links.

Figure 2:
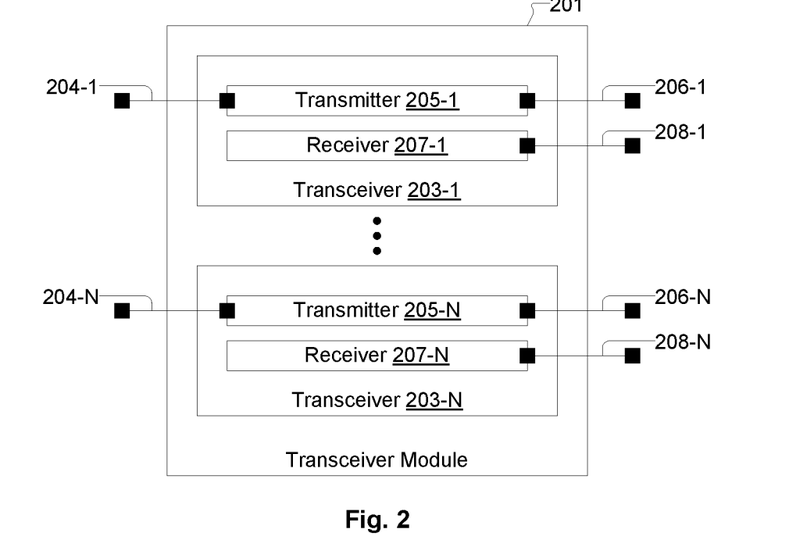
FIG. 2 shows an example architecture of a transceiver module for use with a remotely located (physically separate) laser light supply system, in accordance with some embodiments of the present invention.

FIG. 2 shows an example architecture of a transceiver module 201 for use with a remotely located (physically separate) laser light supply system, in accordance with some embodiments of the present invention. The transceiver module 201 includes a number (N) of transceivers 203-1 to 203-N. The transceivers 203-1 to 203-N include transmitters 205-1 to 205-N and receivers 207-1 to 207-N, respectively. Each transmitter 205-1 to 205-N has an optical input 204-1 to 204-N, respectively, through which continuous wave laser light is received from the remotely located laser light supply system. In some embodiments, continuous wave laser light is transmitted from the remotely located laser light supply system to the optical inputs 204-1 to 204-N of the transmitters 205-1 to 205-N through optical conveyance devices. It should be understood that the term "optical conveyance device" as used herein can refer to an optical fiber, or an optical waveguide, or any other type of device configured to convey photons from one location to another location. Each transceiver 203-1 to 203-N is configured to convert a data signal between the optical and electrical domains. The transmitters 205-1 to 205-N convert a data signal from the electrical domain to the optical domain. And, the receivers 207-1 to 207-N convert a data signal from the optical domain to the electrical domain.

Each transmitter 205-1 to 205-N is configured to modulate the light received through its optical input from the remotely located laser light supply system to generate a light stream of encoded data. Each transmitter 205-1 to 205-N is also configured to transmit the light stream of encoded data through an optical output 206-1 to 206-N, respectively. In some embodiments, optical conveyance devices are optically connected to the optical outputs 206-1 to 206-N of the transmitters 205-1 to 205-N for conveyance of the light streams of encoded data to other downstream devices. The receivers 207-1 to 207-N are configured and connected to receive modulated light through respective optical inputs 208-1 to 208-N. The received modulated light represents a light stream of encoded data. The receivers 207-1 to 207-N are also configured to decode the modulated light from the optical domain into the electrical domain, in which the data is represented by electrical signals. In some embodiments, the transceivers referred to herein are DWDM transceivers configured to operate according to the International Telecommunication Union's Telecommunication Standardization Sector (ITU-T). However, in other embodiments, the transceivers referred to herein can operate in a different wavelength range or be non-DWDM transceivers.

Figure 3:
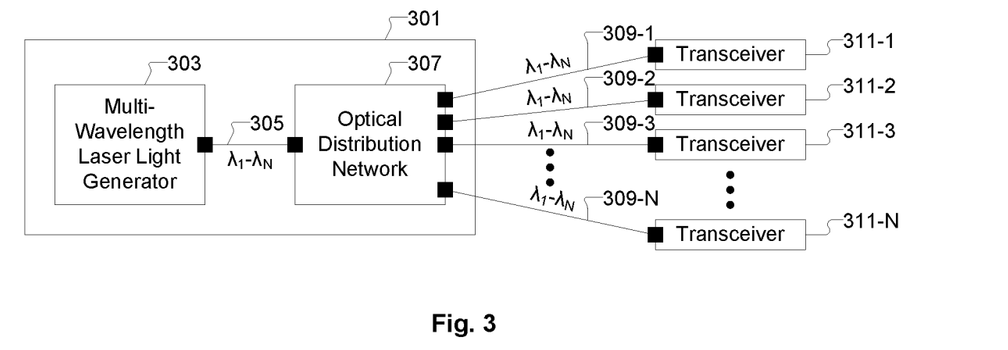
FIG. 3 shows an example architecture of a laser light supply system for fiber-optic data communication, in accordance with some embodiments of the present invention.

FIG. 3 shows an example architecture of a laser light supply system 301 for fiber-optic data communication, in accordance with some embodiments of the present invention. The laser light supply system 301 includes a laser light generator 303 configured to simultaneously generate multiple wavelengths of continuous wave laser light. The laser light generator 303 has an optical output. The laser light generator 303 is configured to collectively and simultaneously transmit each of the multiple wavelengths ($\lambda_1$-$\lambda_N$) of continuous wave laser light through the optical output as a laser light supply. The laser light supply system 301 also includes an optical conveyance device 305 connected to receive the laser light supply from the optical output of the laser light generator 303. It should be understood that the laser light generator 303 operates to produce and transmit N different wavelengths of light ($\lambda_1$ to $\lambda_N$) on the optical conveyance device 305 simultaneously. In some embodiments, the optical conveyance device 305 is a single-mode optical fiber.

The laser light supply system 301 also includes an optical distribution network 307 having an optical input connected to receive the laser light supply from the optical conveyance device 305. The optical distribution network 307 is configured to transmit, i.e., fan out, the laser light supply to each of one or more optical transceivers 311-1 to 311-N. In some embodiments, the optical distribution network 307 includes an optical splitter network configured to split (fan-out) the total laser light power output by the laser light generator 303 to supply laser light to multiple optical links, such as to multiple DWDM links. In some embodiments, the optical distribution network 307 uses optical conveyance devices to guide the laser light from the output of the laser light generator 303 to the various optical links. For example, FIG. 3 shows that the laser light supply is transmitted through optical conveyance devices 309-1 to 309-N to the optical transceivers 311-1 to 311-N, respectively. In some embodiments, the optical conveyance devices 309-1 to 309-N are single-mode optical fibers. Therefore, each of the optical transceivers 311-1 to 311-N receives each of the multiple wavelengths ($\lambda_1$-$\lambda_N$) of continuous wave laser light in a simultaneous manner through its respective one of the optical conveyance devices 309-1 to 309-N.

It should be understood that the laser light generator 303 is physically separate from each of the one or more optical transceivers 311-1 to 311-N. In various embodiments, the generated continuous wave multiple wavelength ($\lambda_1$-$\lambda_N$) laser light can be split among several optical conveyance devices, and may or may not be amplified before or after splitting, as the continuous wave laser light of the multiple wavelengths ($\lambda_1$-$\lambda_N$) is distributed for use at multiple locations, such as at multiple transceiver locations within a data center. For example, in some embodiments, passive and/or active optical power splitters can be provided in the light distribution paths of the optical distribution network 307 to provide for the splitting (fanning-out) of the total laser light power output by the laser light generator 303 to the various optical links.

In some embodiments, the optical distribution network 307 itself is distributed, with various optical components implemented on optical-electrical devices (such as silicon-photonic chips or other types of devices) using passive waveguide couplers and optical filters and/or external optical components such as fused-fiber optical couplers and optical splitters. The optical splitter network of the optical distribution network 307 can include active optical components. For example, in some embodiments, optical amplifiers can be inserted in the optical distribution network 307 to mitigate laser light losses during distribution and/or to lower the laser light output power requirement of the laser light generator 303. It should be understood that in various embodiments the optical amplifiers referred to herein can be configured as either semiconductor optical amplifiers (SOAs), erbium-doped fiber amplifiers (EDFAs), ytterbium-doped fiber amplifiers (YDFAs), tapered amplifier (TAS), and/or other types of optical amplifiers. In some embodiments, when optical amplifiers are used to lower the laser light output power requirement of the laser light generator 303, the laser light generator 303 can essentially function as a wavelength reference. In these embodiments, the laser light generator 303 is responsible for producing laser light at each of the multiple wavelengths ($\lambda_1$-$\lambda_N$), and the optical distribution network 307 is responsible for amplifying and distributing the laser light power at each of the multiple wavelengths to the levels needed for the transceiver modules 311-1 to 311-N.

As an example of the amount of laser power output by the laser light supply system 301, consider a top-of-rack (TOR) switch with an aggregate 5 terabits per second (Tb/s) of bandwidth that uses DWDM transceivers transmitting at 10 gigabits per second (Gb/s) per wavelength channel. At this data rate, the DWDM transceiver requires 1 mW of laser power on each wavelength channel. Under these conditions, the laser light supply system 301 would need to supply 500 mW of total laser power to the TOR switch in order to meet the total laser power requirement.

It should be understood that the laser light supply system 301 includes a continuous wave laser light source (the laser light generator 303) and a passive and/or active optical splitter/amplifier network (optical distribution network 307) for distribution of the laser power to multiple optical links. In some embodiments, the laser light supply system 301 can also include redundant laser light sources for backup in the case of failure of a laser light source. In some embodiments, the laser light supply system 301 uses optical conveyance devices to optically connect various optical components together through their respective optical ports. In some embodiments, the laser light supply system 301 uses single-mode optical fibers. In some embodiments, the laser light supply system 301 uses polarization-maintaining single-mode optical fibers in conjunction with polarization sensitive components, such as optical amplifiers, optical isolators, and/or optical transceivers.

Figure 4:
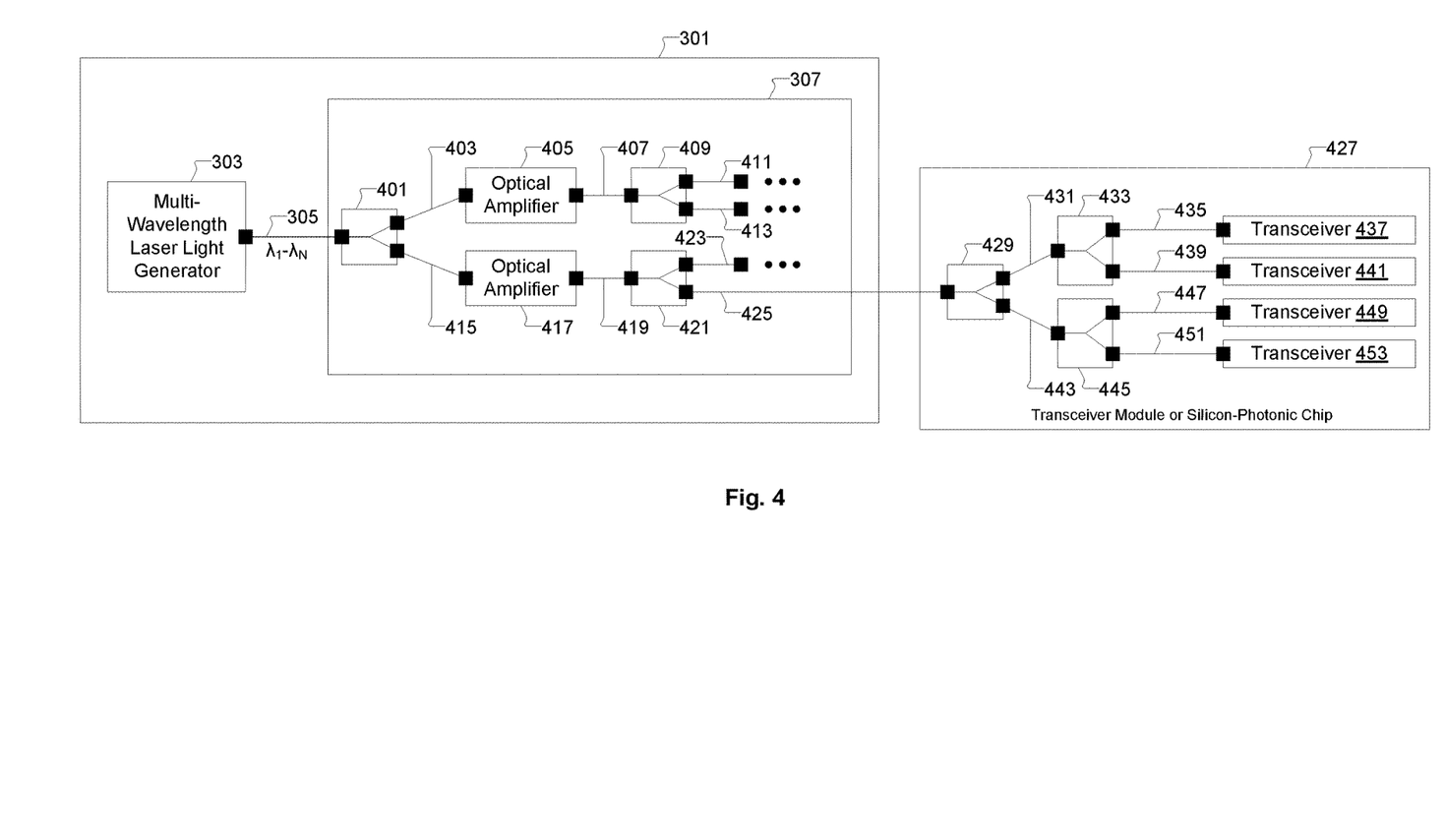
FIG. 4 shows the laser light supply system with an example architecture of the optical distribution network, in accordance with some embodiments of the present invention.

FIG. 4 shows the laser light supply system 301 with an example architecture of the optical distribution network 307, in accordance with some embodiments of the present invention. The optical distribution network 307 is configured to power-split the laser light supply received from the laser light generator 303 into multiple optical conveyance devices through optical couplers and/or optical splitters. Also, optical amplifiers are disposed within the optical distribution network 307 to enable a larger number of transceiver endpoints, and to allow for potentially less power in the laser light supply provided by the laser light generator 303.

It should be understood that the architecture of the optical distribution network 307 as shown in FIG. 4 is provided as an example for description purposes. In different embodiments, the optical distribution network 307 can include essentially any arrangement of optical couplers, optical splitters, and optical amplifiers, as well as other optical components, as needed to distribute the laser light supply provided by the laser light generator 303 to each of multiple transceivers.

In the example of FIG. 4, the laser light supply provided by the laser light generator 303 is received into an optical splitter 401. The optical splitter is configured to transmit a first portion of the incoming laser light onto an optical conveyance device 403 and transmit a second portion of the incoming laser light onto an optical conveyance device 415. The optical conveyance device 403 is connected to an optical amplifier 405, which is configured to amplify the power of the light it receives from the optical conveyance device 403 without changing its wavelength(s). Similarly, the optical conveyance device 415 is connected to an optical amplifier 417, which is configured to amplify the power of the light it receives from the optical conveyance device 415 without changing its wavelength(s). The light output from the optical amplifier 405 is transmitted through an optical conveyance device 407 to another optical splitter 409, which is configured to split the light it receives onto two additional optical conveyance devices 411 and 413. And, similarly, the light output from the optical amplifier 417 is transmitted through an optical conveyance device 419 to another optical splitter 421, which is configured to split the light it receives onto two additional optical conveyance devices 423 and 425. It should be understood that the optical distribution network 307 can include as many optical devices as needed to duplicate and transmit the laser light supply as provided by the laser light generator 303 onto as many optical conveyance devices as there are transceivers (or other components) to be supplied with the laser light supply.

Additionally, the transceiver modules, such as transceiver module 201, can also include optical couplers, optical splitters, and optical amplifiers, as well as other optical components, as needed to appropriately distribute the laser light supply received at the optical input of the transceiver module to the various transceivers within the transceiver module. For example, FIG. 4 shows a transceiver module 427 that receives the incoming laser light supply into an optical splitter 429. The optical splitter 429 is configured to transmit a first portion of the incoming laser light onto an optical conveyance device 431 and transmit a second portion of the incoming laser light onto an optical conveyance device 443. The optical conveyance device 431 is connected to another optical splitter 433 which is configured to transmit a portion of the incoming laser light onto an optical conveyance device 435 and transmit another portion of the incoming laser light onto an optical conveyance device 439. The optical conveyance device 435 is connected to the optical input of a transceiver 437, so that the laser light supply transmitted through the optical conveyance device 435 is provided to the transceiver 437. Also, the optical conveyance device 439 is connected to the optical input of a transceiver 441, so that the laser light supply transmitted through the optical conveyance device 439 is provided to the transceiver 441.

Similarly, the optical conveyance device 443 is connected to another optical splitter 445 which is configured to transmit a portion of the incoming laser light onto an optical conveyance device 447 and transmit another portion of the incoming laser light onto an optical conveyance device 451. The optical conveyance device 447 is connected to the optical input of a transceiver 449, so that the laser light supply transmitted through the optical conveyance device 447 is provided to the transceiver 449. Also, the optical conveyance device 451 is connected to the optical input of a transceiver 453, so that the laser light supply transmitted through the optical conveyance device 451 is provided to the transceiver 453. It should be understood that the transceiver module 427 can include as many optical devices as needed to split/divide and transmit the laser light supply as provided by the laser light generator 303 onto as many optical conveyance devices as there are transceivers to be supplied with the laser light supply.

It should also be understood that the laser light supplied to each of the transceivers 437, 441, 449, and 453 includes each of the multiple wavelengths ($\lambda_1$-$\lambda_N$) of continuous wave laser light as generated by the laser light generator 303. Also, in some embodiments, various optical components (optical splitters, optical couplers, optical amplifiers, etc.) within the optical distribution network 307 and/or transceiver module(s) 427 can be implemented within one or more optical-electrical devices (such as silicon-photonic chips or other types of semiconductor chips formed of a III-V material) and/or as discrete components. For example, an optical amplifier can be integrated in a hybrid manner within a silicon-photonic chip or can be placed between optical-electrical devices. This may be particularly useful for final stage optical power splitting and distribution. It should be understood that both an optical-electrical device, e.g., silicon-photonic chip, and a transceiver module can include multiple individual transceivers.

The laser light generator 303 can be configured in different ways in various embodiments. In some embodiments, the laser light generator 303 is configured using a comb laser to generate multiple wavelengths of laser light ($\lambda_1$ to $\lambda_N$) for transmission on the optical conveyance device 305. Also, in some embodiments, the laser light generator 303 is configured using separate lasers to generate each wavelength of laser light ($\lambda_1$ to $\lambda_N$), and is further configured to combine the multiple wavelengths of laser light ($\lambda_1$ to $\lambda_N$) for transmission through one or more optical conveyance devices.

The comb laser includes a single laser that has a single lasing cavity which is used to produce all of the multiple laser light wavelengths ($\lambda_1$ to $\lambda_N$) in a wavelength comb spectrum. In some embodiments, the wavelengths in the wavelength comb spectrum correspond to the wavelengths required by the DWDM optical links that are supplied with laser light by the laser light supply system 301. The comb laser can have one or more optical outputs. In the case of multiple optical outputs, the same set of laser light wavelengths ($\lambda_1$ to $\lambda_N$) are supplied at each optical output of the comb laser. In some embodiments, the comb laser does not need to be a high-power output laser. More specifically, the comb laser can provide a low-power laser light output, and this low-power laser light output can be amplified using one or more optical amplifiers in order to increase the total laser light output power of the laser light supply system 301. It should be understood that in order to protect active optical components within the laser light supply system 301, such as the comb laser for example, fiber-optic isolators can be inserted at the optical inputs and/or optical outputs of the active optical components, if appropriate optical isolation capability is not already included within the active optical components themselves.

If the transceivers have innate wavelength-locking capability, such as with DWDM transceivers, the wavelengths output by the laser light generator 303 do not need to be constant and thermally-stable, so long as the changes in wavelength are within the wavelength-locking range of the transceivers, and so long as the wavelength channel spacing is maintained to meet minimum channel-to-channel separation specifications. With the laser light generator 303 implemented as the single cavity comb laser, the wavelength channel spacing requirement is guaranteed. However, the comb laser should have a thermal mode-hop-free range that is equivalent to the range of temperature fluctuations experienced by the laser light generator 303.

In some embodiments, instead of using the comb laser, the laser light generator 303 is implemented as a set of lasers, with each laser in the set of lasers producing a single wavelength of light of some specified subset of wavelengths of light. The outputs of the multiple lasers in the set of lasers are combined in an optical combiner network to form a wavelength comb spectrum using passive and/or active optical components. Also, the total combined laser light power output by the optical combiner network is supplied to the optical distribution network 307 on one or more optical conveyance devices 305.

Figure 5A:
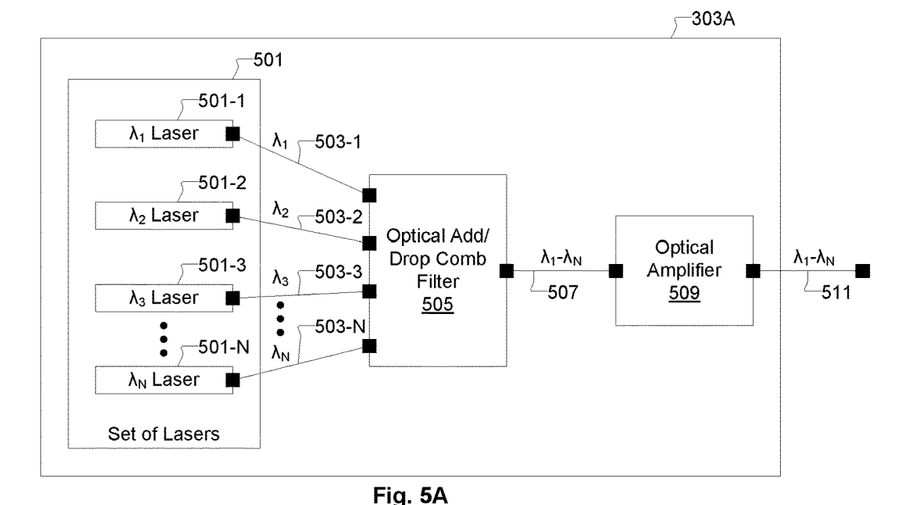
FIG. 5A shows a laser light generator that combines the laser light output of multiple single-wavelength continuous wave lasers onto an optical conveyance device, in accordance with some embodiments of the present invention.

FIG. 5A shows a laser light generator 303A that combines the laser light output of multiple (N) single-wavelength continuous wave lasers onto an optical conveyance device 511, in accordance with some embodiments of the present invention. It should be understood that the laser light generator 303A is an embodiment of the laser light generator 303. The laser light generator 303A includes a set of lasers 501. The set of lasers 501 includes multiple (N) lasers 501-1 to 501-N. Each laser 501-1 to 501-N is configured to generate continuous wave laser light at a different wavelength, such that the lasers 501-1 to 501-N generate laser light wavelengths $\lambda_1$ to $\lambda_N$, respectively. The laser light generator 303A also includes a set of optical conveyance devices, which includes optical conveyance devices 503-1 to 503-N, which respectively correspond to the lasers 501-1 to 501-N in the set of lasers 501. Each optical conveyance device 503-1 to 503-N in the set of optical conveyance devices is connected to receive the continuous wave laser light generated by its corresponding laser 501-1 to 501-N in the set of lasers 501. In some embodiments, the optical conveyance devices 503-1 to 503-N can be optical waveguides, optical fibers, or other types of optical conveyance devices. In some embodiments, the optical conveyance devices 503-1 to 503-N are single-mode optical fibers.

The laser light generator 303A also includes an optical add/drop comb filter 505 having a set of optical inputs respectively connected to the optical conveyance devices 503-1 to 503-N, such that the optical add/drop comb filter 505 is connected to separately receive the continuous wave laser light at the different wavelength as generated by each laser 501-1 to 501-N of the set of lasers 501. The optical add/drop comb filter 505 is configured to combine the continuous wave laser light at the different wavelength as generated by each laser 501-1 to 501-N of the set of lasers 501 together onto a common optical conveyance device that is optically connected to an optical output of the optical add/drop comb filter 505. The laser light generator 303A of FIG. 5A represents an N-channel combiner network implemented using the optical add/drop comb filter 505. In various embodiments, the optical add/drop comb filter 505 can be implemented using an N-channel arrayed waveguide grating (AWG), echelle gratings, or as a bank of N microring resonators with separate drop ports. In various embodiments, some components of the laser light generator 303A can be implemented on silicon-photonic chips or externally.

Figure 6:
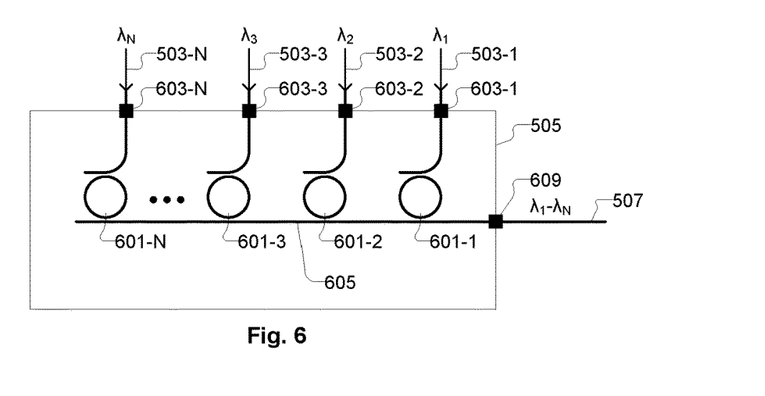
FIG. 6 shows an example diagram of the optical add/drop comb filter, in accordance with some embodiments of the present invention.

FIG. 6 shows an example diagram of the optical add/drop comb filter 505, in accordance with some embodiments of the present invention. The optical add/drop comb filter 505 is implemented using a bank of silicon-photonic microring resonator devices 106-1 to 106-N. The continuous wave laser light output by each laser 503-1 to 503-N enters the optical add/drop comb filter 505 through a different optical port 603-1 to 603-N, respectively, and gets added together on a common optical conveyance device 605. The common optical conveyance device 605 is optically connected to an optical output 609 of the optical add/drop comb filter 505, which is in turn optically connected to an optical conveyance device 507. In this manner, the multiple wavelengths ($\lambda_1$-$\lambda_N$) of laser light generated by the set of lasers 501 are combined together on the common optical conveyance device 605, and are transmitted together through the optical conveyance device 507. In some embodiments, the optical conveyance device 507 is a single-mode optical fiber. In some embodiments, the optical add/drop comb filter 505 is configured to provide selection control over which of the different wavelengths ($\lambda_1$-$\lambda_N$) of continuous wave laser light as generated by the set of lasers 501 are combined together on the common optical conveyance device 605.

The optical conveyance device 507 is connected to receive light transmitted from the optical output 609 of the optical add/drop comb filter 505. In some embodiments, an optical amplifier 509 can be optionally used at the output of the laser light generator 303A to compensate for light losses in distribution. When used, an optical input of the optical amplifier 509 is optically connected to receive light from the optical conveyance device 507. The optical amplifier 509 is configured to amplify each wavelength of light ($\lambda_1$-$\lambda_N$) received at its optical input to generate amplified light. The optical amplifier 509 is configured to transmit the amplified light as the laser light supply to the optical output of the laser light generator 303A and onto the optical conveyance device 511. In some embodiments where the optical amplifier 509 is not used, the optical output 609 of the optical add/drop comb filter 505 is optically connected to the optical output of the laser light generator 303A and onto the optical conveyance device 511.

Figure 5B:
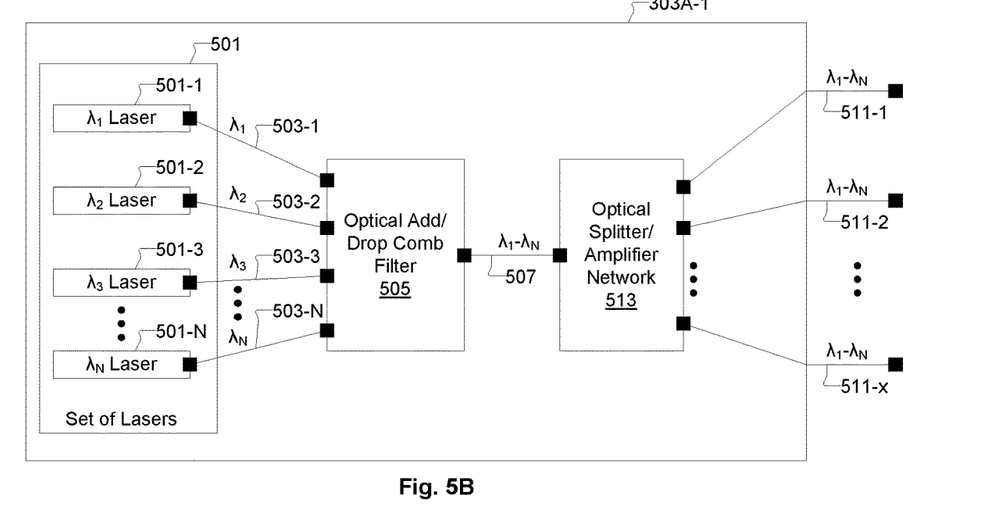
FIG. 5B shows a laser light generator that combines the laser light output of multiple single-wavelength continuous wave lasers onto multiple optical conveyance devices, in accordance with some embodiments of the present invention.

FIG. 5B shows a laser light generator 303A-1 that combines the laser light output of multiple (N) single-wavelength continuous wave lasers onto multiple optical conveyance devices 511-1 through 511-x, in accordance with some embodiments of the present invention. It should be understood that the laser light generator 303A-1 is an embodiment of the laser light generator 303. The laser light generator 303A-1 includes an optical splitter/amplifier network 513 optically connected to receive light from the optical conveyance device 507. The optical splitter/amplifier network 513 is configured to split, and if necessary amplify, each wavelength of light ($\lambda_1$-$\lambda_N$) received at its optical input in order to transmit each wavelength of light ($\lambda_1$-$\lambda_N$) as the laser light supply to each of the multiple optical conveyance devices 511-1 through 511-x.

It should be understood that the laser light generator 303A-1 includes the optical splitter network 513 which has an optical input optically connected to receive the light transmitted through the common optical conveyance device 507. The laser light generator 303A-1 has multiple optical outputs. The optical splitter network 513 is configured to split the light received through its optical input onto the multiple optical conveyance devices 511-1 through 511-x, such that each of the one or more wavelengths ($\lambda_1$-$\lambda_N$) of continuous wave laser light is provided as the laser light supply to each of the multiple optical outputs of the laser light generator 303A-1.

Figure 7:
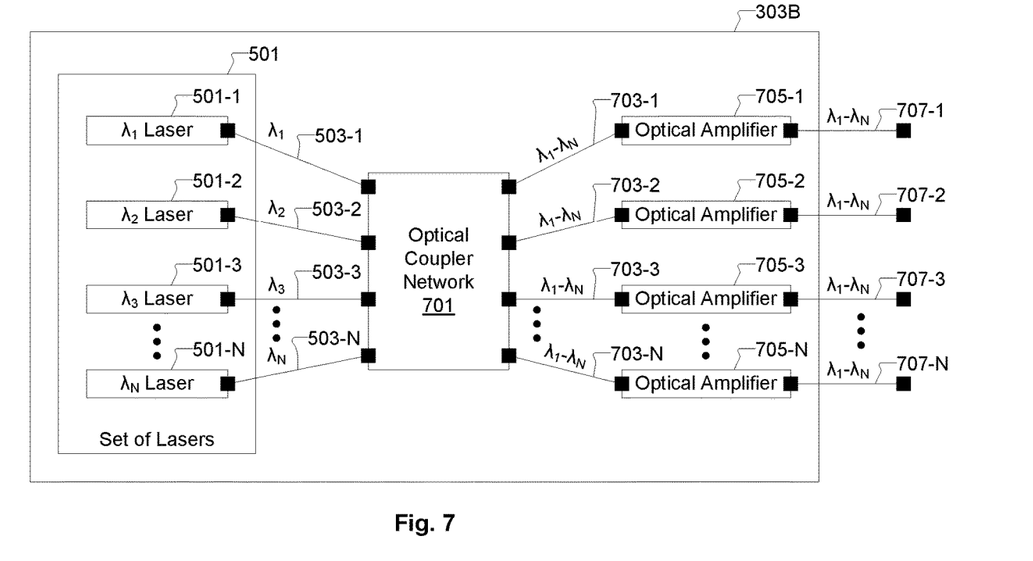
FIG. 7 shows a laser light generator that couples together the laser light output of multiple single-wavelength continuous wave lasers and outputs all of the multiple wavelengths of laser light onto each of multiple optical conveyance devices, in accordance with some embodiments of the present invention.

FIG. 7 shows a laser light generator 303B that couples together the laser light output of multiple (N) single-wavelength continuous wave lasers and outputs all of the multiple wavelengths of laser light onto each of multiple optical conveyance devices 707-1 to 707-N, in accordance with some embodiments of the present invention. It should be understood that the laser light generator 303B is an embodiment of the laser light generator 303. The laser light generator 303B includes the set of lasers 501, including the multiple (N) lasers 501-1 to 501-N, as described with regard to FIG. 5A. The laser light generator 303B includes an optical coupler network 701 having a set of optical inputs respectively connected to the set of optical conveyance devices 503-1 to 503-N such that the optical coupler network 701 is connected to separately receive the continuous wave laser light at the different wavelength as generated by each laser 501-1 to 501-N of the set of lasers 501.

The optical coupler network 701 is configured to combine the continuous wave laser light at the different wavelength as generated by each laser 501-1 to 501-N of the set of lasers 501 together onto each of multiple optical conveyance devices, such that each of the multiple optical conveyance devices is connected to receive all of the different wavelengths ($\lambda_1$-$\lambda_N$) of continuous wave laser light generated by the set of lasers 501. Each of the multiple optical conveyance devices within the optical coupler network 701 is optically connected to a respective one of multiple optical outputs of the optical coupler network 701, which are respectively optically connected to optical conveyance devices 703-1 to 703-N of a second set of optical conveyance devices.

The laser light generator 303B includes a set of optical amplifiers 705-1 to 705-N. Each optical conveyance device 703-1 to 703-N in the second set of optical conveyance devices is optically connected to an optical input of a different optical amplifier 705-1 to 705-N in the set of optical amplifiers. Each optical amplifier 705-1 to 705-N in the set of optical amplifiers is configured to amplify each wavelength of light received at its optical input to generate amplified light. Each optical amplifier 705-1 to 705-N in the set of optical amplifiers is configured to transmit the amplified light as the laser light supply to a different one of multiple optical outputs 707-1 to 707-N of the laser light generator 303B.

The laser light generator 303B of FIG. 7 represents an N-channel combiner network implemented using the optical coupler network 701 configured to couple the N wavelengths together and output all combined N wavelengths of light on 1 to N optical conveyance devices. In some embodiments, the optical coupler network 701 is configured as a star optical coupler, i.e., an N-input to N-output optical coupler. In the embodiments in which the laser light generator 303B has multiple optical conveyance device outputs 707-1 to 707-N, each optical conveyance device output 707-1 to 707-N can be routed to a different destination and can be amplified as needed. In various embodiments, some components of the laser light generator 303B can be implemented on silicon-photonic chips or externally.

In some embodiments in which the laser light generator 303 is implemented using the set of lasers 501, the lasers 501-1 to 501-N are mounted on a shared, highly-thermally-conductive substrate, such that all lasers 501-1 to 501-N experience the same thermal variations. In these embodiments, because the output wavelength of a given laser 501-1 to 501-N is affected by the temperature of the laser, when all the lasers 501-1 to 501-N are mounted on the same substrate so as to experience the same thermal variation, the output wavelengths of the different lasers 501-1 to 501-N will move together to ensure a consistent wavelength channel spacing in the output of the laser light generator 303. In these embodiments, because the lasers 501-1 to 501-N are thermally coupled, the lasers 501-1 to 501-N can be operated in an uncooled manner and can be allowed to drift together (with regard to wavelength) with changes in system temperature. This drift in wavelength can be tracked by the wavelength-locking circuitry implemented within the transmitters and receivers of the optical link, such as the DWDM link.

Figure 8:
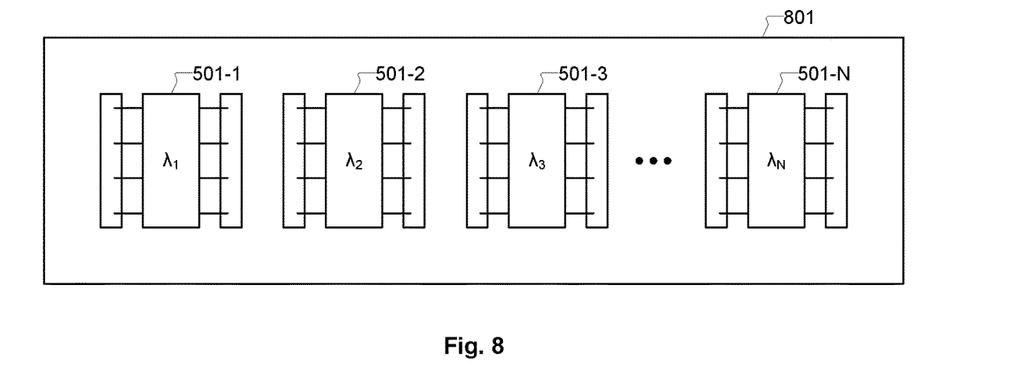
FIG. 8 shows the multiple lasers of the set of lasers mounted on a common (shared) thermally conductive substrate, in accordance with some embodiments of the present invention.

FIG. 8 shows the multiple lasers 501-1 to 501-N of the set of lasers 501 mounted on a common (shared) thermally conductive substrate 801, in accordance with some embodiments of the present invention. The common thermally conductive substrate 801 is configured to distribute heat emanating from each laser 501-1 to 501-N in the set of lasers 501. In this manner, the thermally conductive substrate 801 acts as a heat spreader so as to equalize the temperatures of all lasers 501-1 to 501-N mounted on the substrate 801.

In some embodiments, the optical transceivers 311-1 to 311-N are configured as dense wavelength division multiplexer (DWDM) transceivers, and as such the optical transceivers 311-1 to 311-N are configured to operate in a wavelength tracking mode. In other words, the optical transceivers 311-1 to 311-N can continue to operate correctly even with drift in the wavelength of the laser light supplied to it by the laser light generator 303. However, with each of the multiple lasers 501-1 to 501-N operating to supply a different wavelength of laser light, it is necessary for the relative spacing between the different wavelengths generated by the multiple lasers 501-1 to 501-N to remain substantially constant.

Most drift in laser light wavelength is caused by variation in temperature of the laser. By having all of the multiple lasers 501-1 to 501-N maintain a substantially same temperature, due to the multiple lasers 501-1 to 501-N being mounted to the common thermally conductive substrate 801, even as the substantially same temperature of the multiple lasers 501-1 to 501-N varies, the relative spacing between the different wavelengths generated by the multiple lasers 501-1 to 501-N will remain substantially constant and trackable by the DWDM transceivers. Also, it should be appreciated that in the embodiments in which the multiple lasers 501-1 to 501-N are mounted to the common thermally conductive substrate 801 and supply laser light to wavelength tracking transceivers (such as DWDM transceivers), the multiple lasers 501-1 to 501-N can be configured without active temperature control. For example, in some embodiments, an optical communication link/system can include the laser light generator 303 having a configuration that is uncooled and not wavelength controlled, allowing the wavelengths of laser light to drift in time, with the laser light generator 303 implemented in conjunction with optical transceivers that have continuous wavelength tracking capability. For example, use of mode-hop-free lasers 501-1 to 501-N mounted on the common thermally conductive substrate 801 in combination with use of wavelength-locking DWDM optical links eliminates the need for precise temperature control of the components in the laser light generator 303, which reduces complexity and saves cost.

In some embodiments, the laser light supply system 301 disclosed herein is deployed and operated to supply laser light to transceivers located in several locations within a data center. The transceivers within the data center can be located next to electrical switches (either on-board the switches or off-board the switches), and/or next to network interface cards (NICs) (either on-board the NICs or off-board the NICs), and/or next to electrical computing components such as central processing units (CPUs), graphics processing units (GPUs), memory devices, among other types of computing components. In some embodiments, the transceivers within the data center can be standalone components disposed either on-board or off-board other electrical components. In some embodiments, the transceivers within the data center can be on the same semiconductor chips as the switch, NIC, or other computing components. It should be understood that the transceivers used in conjunction with the laser light supply system 301 disclosed herein do not generate laser light themselves. Rather, each transceiver is configured to receive a supply of multiple-wavelength continuous wave laser light through an optical conveyance device that is optically connected between itself and the laser light supply system 301. The transceivers modulate the continuous wave laser light to imprint the data to be transmitted into a data light stream. The modulated laser light, i.e., the data light stream, enters another optical conveyance device, which delivers the modulated laser light to another location where the modulated laser light is optically received, such as by another transceiver.

In some embodiments, the transceivers are connected to serve data center switches. In these embodiments, the laser light supply system 301 is located either in the switch box as a module, or on a shelf in the same rack as the switch, or is located in a dedicated rack or cabinet. In some embodiments, the dedicated rack or cabinet has the sole purpose of generating and supplying laser light power to transceivers in one or more switches in the data center. Also, in some embodiments, the transceivers are located next to NICs or computing components. In some of these embodiments, the laser light supply system 301 is located on one shelf in a rack of the data center, and the laser light supply system 301 is connected to supply laser light to components in multiple shelves of the same rack. Also, in some of these embodiments, the laser light supply system 301 is located in a centralized cabinet that supplies light to multiple transceivers in multiple racks.

It should be understood that physically separating the laser light supply system 301 from the transceivers enables placement of the laser light supply system 301 away from areas of large temperature variation (such as exist in the vicinity of switch chips, CPUs/GPUs, NICs, etc.), thereby improving laser power-efficiency and reliability. Separating the laser light supply system 301 from the transceivers also enables accessibility to the laser light sources, e.g., to lasers 501-1 to 501-N, for maintenance and replacement. And, separating the laser light supply system 301 from the transceivers enables supply of continuous wave laser light to multiple transceivers using a single laser light supply system 301.

Figure 9:
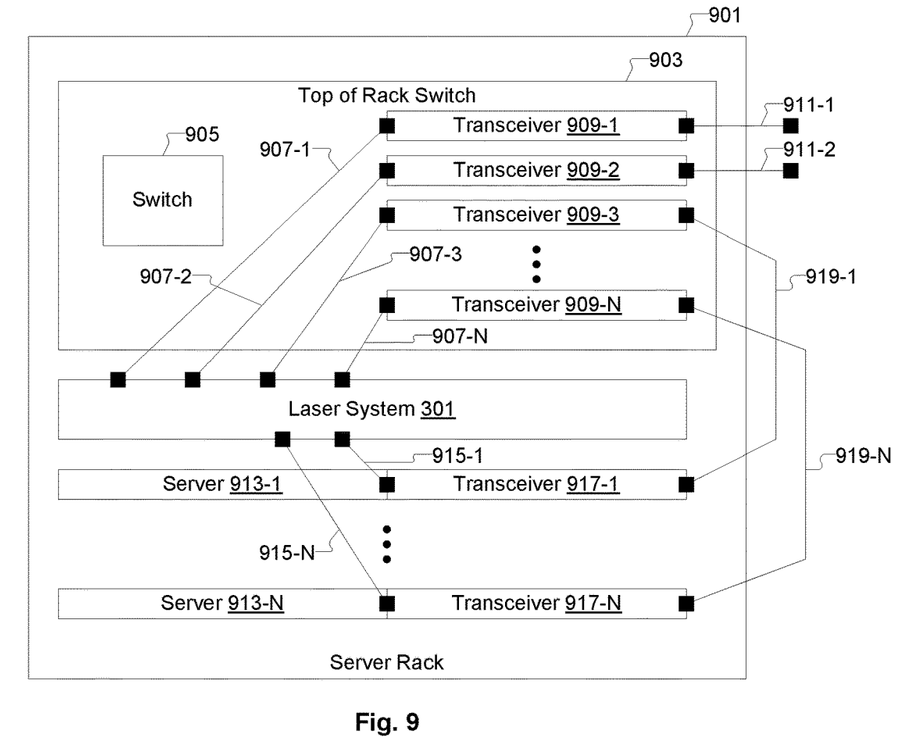
FIG. 9 shows the laser light supply system mounted within a server rack as a rack unit within a data center, in accordance with some embodiments of the present invention.

FIG. 9 shows the laser light supply system 301 mounted within a server rack 901 as a rack unit within a data center, in accordance with some embodiments of the present invention. The laser light supply system 301 is optically connected to supply continuous wave laser power to all optical transceivers in the rack 901. For example, the laser light supply system 301 is optically connected to supply laser power to transceivers 909-1 to 909-N in a top-of-rack switch 903 by way of optical connections 907-1 to 907-N, respectively. The top-of-rack switch 903 includes switch 905. The laser light supply system 301 is also optically connected to supply continuous wave laser power to individual NICs connected to server rack units 913-1 to 913-N by way of optical connections 915-1 to 915-N, respectively. The server rack units 913-1 to 913-N have corresponding transceivers 917-1 to 917-N. Each of the transceivers 909-1 to 909-N and 917-1 to 917-N has an optical output through which its transmitter can transmit an optical data stream and an optical input through which its receiver can receive an optical data stream. Some transceivers can be connected to send and/or receive optical data streams to/from other components outside of the server rack 901, such as indicated by optical communication links 911-1 and 911-2. And, some transceivers can be connected to send and/or receive optical data streams to/from other transceivers within the server rack 901, such as indicated by optical communication links 919-1 and 919-N.

Figure 10:
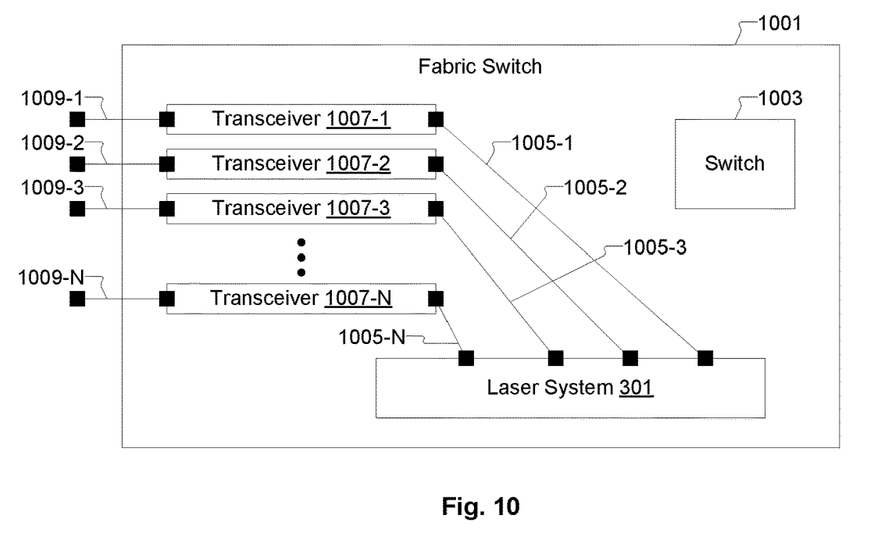
FIG. 10 shows the laser light supply system mounted inside a fabric switch in a data center, in accordance with some embodiments of the present invention.

FIG. 10 shows the laser light supply system 301 mounted inside a fabric switch 1001 in a data center, in accordance with some embodiments of the present invention. The fabric switch includes switch 1003. The laser light supply system 301 is optically connected to supply laser power to all transceivers 1007-1 to 1007-N in the fabric switch by way of optical connections 1005-1 to 1005-N. Each of the transceivers 1007-1 to 1007-N has an optical output through which its transmitter can transmit an optical data stream and an optical input through which its receiver can receive an optical data stream. The transceivers 1007-1 to 1007-N can be connected to send and/or receive optical data streams to/from other components outside of the fabric switch 1001, as indicated by optical communication links 1009-1 to 1009-N.

Figure 11:
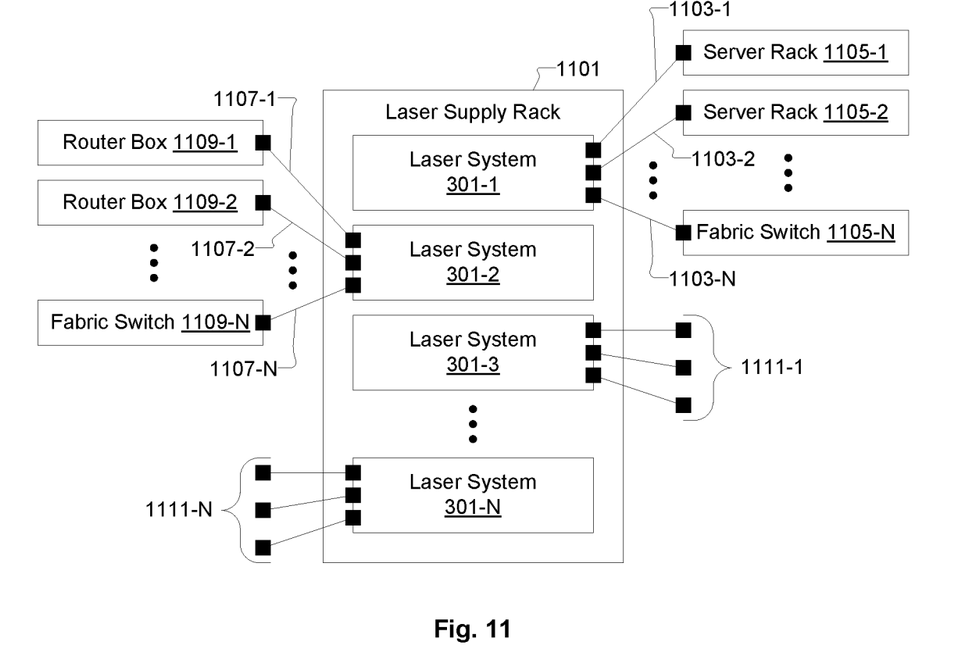
FIG. 11 shows a number of laser light supply systems placed in a dedicated laser supply rack/cabinet in a data center, in accordance with some embodiments of the present invention.

FIG. 11 shows a number of laser light supply systems 301-1 to 301-N placed in a dedicated laser supply rack/cabinet 1101 in a data center, in accordance with some embodiments of the present invention. Each of the laser light supply systems 301-1 to 301-N can be optically connected, such as through an optical conveyance device, to supply laser power to other components within the data center. For example, laser light supply system 301-1 is optically connected to supply laser power to components 1105-1 to 1105-N by way of optical connections 1103-1 to 1103-N, respectively, where each of components 1105-1 to 1105-N is a server rack or fabric switch or other component within the data center. Similarly, laser light supply system 301-2 is optically connected to supply laser power to components 1109-1 to 1109-N by way of optical connections 1107-1 to 1107-N, respectively, where each of components 1109-1 to 1109-N is a router box or fabric switch or other component within the data center. And, similarly, laser light supply systems 301-3 to 301-N can be optically connected to supply laser power to components within the data center by way of optical connections 1111-1 to 1111-N. Also, it should be understood that each of the laser light supply systems 301-3 to 301-N can be configured to have essentially any number of laser light supply outputs.

It should be understood that the embodiments shown in FIGS. 9, 10, and 11, represent examples of how the laser light supply system 301 can be deployed within a data center, and are neither exhaustive nor limiting with regard to how the laser light supply system 301 can be deployed within a data center. In other embodiments, the laser light supply system 301 can be utilized within a data center in configurations not specifically illustrated herein. It should be understood that the laser light supply system 301 is configured to remotely and independently generate a laser light supply of multiple wavelength continuous wave laser light that can be optically distributed through the optical distribution network 307 for use by any number of components within the data center.

Figure 12:
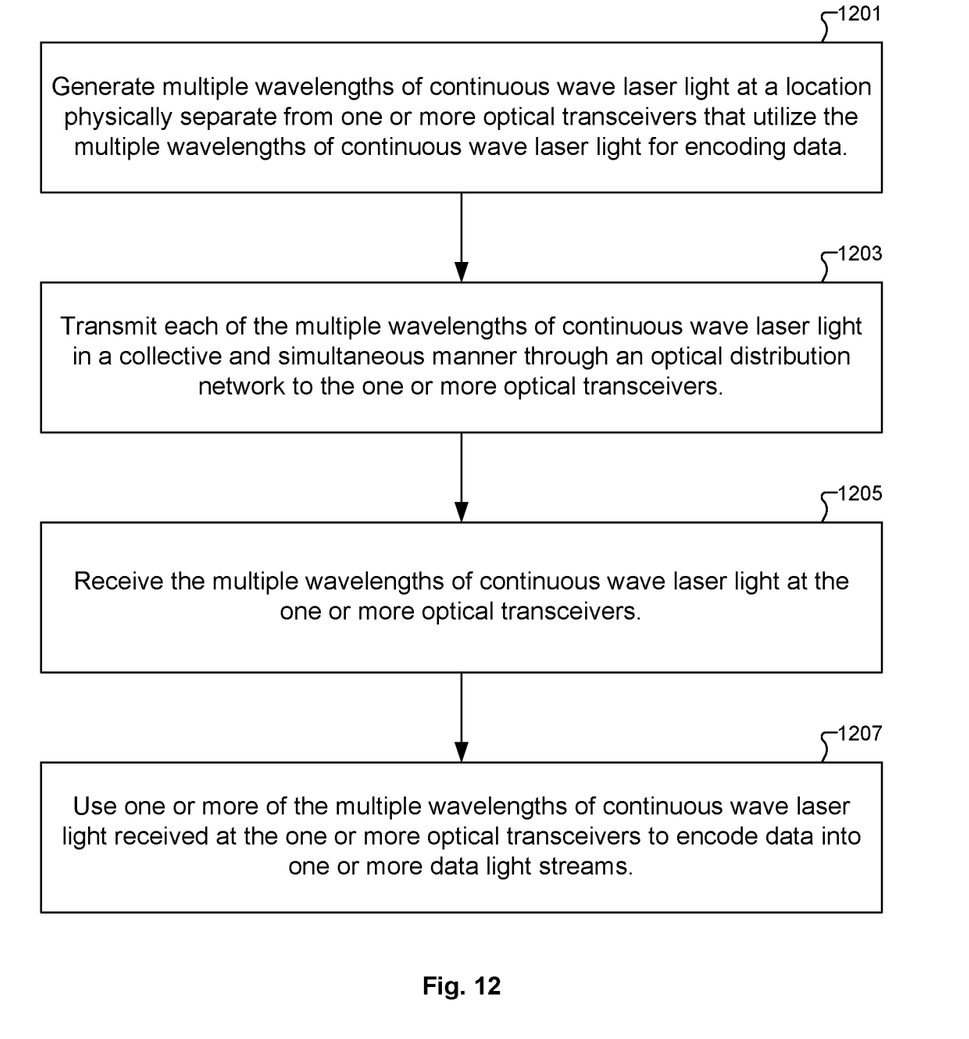
FIG. 12 shows a flowchart of a method for supplying laser light for fiber-optic data communication, in accordance with some embodiments of the present invention.

FIG. 12 shows a flowchart of a method for supplying laser light for fiber-optic data communication, in accordance with some embodiments of the present invention. The method includes an operation 1201 for generating multiple wavelengths of continuous wave laser light at a location physically separate from one or more optical transceivers that utilize the multiple wavelengths of continuous wave laser light for encoding data. Each of the multiple wavelengths of continuous wave laser light is available for encoding separate data into a separate data light stream. The method also includes an operation 1203 for transmitting each of the multiple wavelengths of continuous wave laser light in a collective and simultaneous manner through an optical distribution network to the one or more optical transceivers. In various embodiments, the optical distribution network includes a network of one or more optical splitters and one or more optical amplifiers. The method also includes an operation 1205 for receiving the multiple wavelengths of continuous wave laser light at the one or more optical transceivers. The method also includes an operation 1207 for using one or more of the multiple wavelengths of continuous wave laser light received at the one or more optical transceivers to encode data into one or more data light streams.

In some embodiments, the method includes combining the multiple wavelengths of continuous wave laser light onto an optical conveyance device for transmission to the optical distribution network. In some embodiments, combining the multiple wavelengths of continuous wave laser light onto the optical conveyance device is done using an optical add/drop comb filter. In some embodiments, the method includes operating the optical add/drop comb filter to either add or drop a selected wavelength of the multiple wavelengths of continuous wave laser light to/from the optical conveyance device. In some embodiments, combining the multiple wavelengths of continuous wave laser light onto the optical conveyance device is done using an optical coupler network. In some embodiments, the optical coupler network is configured to combine each of the multiple wavelengths of continuous wave laser light onto each of multiple optical conveyance devices, such that each of the multiple optical conveyance devices is connected to receive all of the multiple wavelengths of continuous wave laser light, with each of the multiple optical conveyance devices optically connected to a respective one of multiple optical outputs of the optical coupler network.

In some embodiments, generating multiple wavelengths of continuous wave laser light in operation 1201 includes operating multiple lasers. Each of the multiple lasers is configured to generate a different wavelength of continuous wave laser light. In some embodiments, the method includes distributing a thermal flux emanating from each of the multiple lasers to maintain each of the multiple lasers at a substantially uniform temperature, and allowing the substantially uniform temperature to vary in accordance with a distributed thermal flux emanating from each of the multiple lasers. In some of these embodiments, the multiple lasers are operated without active temperature control, and the optical transceiver is operated in a wavelength tracking mode. In some embodiments, the optical transceiver is configured as a DWDM transceiver.

In some embodiments, the laser light supply system 301 disclosed herein provides for inclusion of multiple wavelengths of laser light on each of multiple optical conveyance devices, and provides for distribution of the output laser power through the multiple optical conveyance devices to multiple locations in a data center. Also, the laser light supply system 301 disclosed herein enables supply of laser power at a high wall-plug energy efficiency. Use of a high-powered multiple wavelength laser light generator 303 across multiple optical links reduces the total number of laser light sources, which in turn increases a mean time to failure of the laser light generator 303 and enables low-overhead controlled redundancy of the laser light sources. It should be understood that the high-powered multiple wavelength laser light generator 303 disclosed herein is capable of producing enough continuous wave laser power to supply multiple DWDM optical links in an optical fiber network. In some embodiments, the laser light supply system 301 disclosed herein is configured to distribute laser light to the DWDM optical links using optical conveyance devices. The optical conveyance devices have low loss, which enables the laser light generator 303 to be placed far away from the transceiver modules, e.g., 311-1 to 311-N, that make up the optical links. In some embodiments, the optical conveyance devices used within the laser light supply system 301 are single-mode optical fibers.

The laser light supply system 301 disclosed herein has multiple applications beyond supplying laser light for data center transceivers. For example, in some embodiments, the laser light supply system 301 can be implemented to generate and supply laser light for light detection and ranging (LIDAR) in automobiles. And, in some embodiments, the laser light supply system 301 can be implemented to generate and supply laser light for optical communication and sensing purposes in home, office, and/or manufacturing electronics, among others. And, in some embodiments, the laser light supply system 301 can be implemented to generate and supply laser light for biometric and/or acoustic sensing using optical devices as the sensing elements.

By way of example, in some automobile application, LIDAR-on-a-chip makes it possible to remove mechanical components from a LIDAR system. In some embodiments, LIDAR chips are placed in several locations on the exterior of an automobile, so that in combination they may sense a 360 degree radius around the automobile. For example, four LIDAR chips may be placed on the automobile, one on each of the four corners of the automobile. In some embodiments, these LIDAR chips can be supplied with laser light using the laser light supply system 301 as a centralized laser source in combination with an optical-fiber-based light distribution network disposed within the automobile, in accordance with the system and methods disclosed herein.

By way of example, in some optical communication applications in the home, office, and/or manufacturing facility, the laser light supply system 301 can be used as a centralized laser light source in combination with an optical-fiber-based light distribution network to provide laser power to multiple electronic devices. In this manner, laser power can be supplied for communicating and/or sensing purposes inside of the electronics, for the purpose of being able to communicate and sense large amounts of information, as well as for reducing the energy usage of the electronics in the facility (home, commercial building, manufacturing facility, etc.).

By way of example, in some biometric and/or acoustic sensing applications, optical devices (in particular resonant optical devices) can leverage their sensitivity to environmental conditions to function as sensing elements. For both biometric and acoustic based sensors, optical devices can be arrayed in large numbers in a two-dimensional array to gain spatial resolution. The biometric sensors primarily use the effect of the presence of a particle on the optical index of refraction, and hence, the device's optical properties. Acoustic sensors use the mechanical deformations caused by acoustic pressure waves to influence the optical behavior of the device. Both biometric and acoustic based sensing systems can use the laser light supply system 301 as a centralized laser source in combination with an optical-fiber-based light distribution network to provide laser power for use across multiple sensing elements in the same array or across multiple arrays.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A rack unit, comprising: a top-of-rack switch disposed within the rack unit, the top-of-rack switch including a first optical transceiver, wherein the first optical transceiver is configured as a dense wavelength division multiplexer transceiver; a server unit disposed within the rack unit, the server unit including a second optical transceiver, wherein the second optical transceiver is configured as a dense wavelength division multiplexer transceiver; and a laser light supply system disposed within the rack unit, the laser light supply system optically connected to both the first optical transceiver and the second optical transceiver, the laser light supply system configured to generate a plurality of wavelengths of continuous wave laser light and convey the plurality of wavelengths of continuous wave laser light to both the first optical transceiver and the second optical transceiver.

2. The rack unit as recited in claim 1, wherein the laser light supply system is physically separated from each of the first optical transceiver and the second optical transceiver.

3. The rack unit as recited in claim 1, wherein the laser light supply system is implemented without active cooling.

4. The rack unit as recited in claim 3, wherein the laser light supply system is implemented without active temperature control.

5. The rack unit as recited in claim 4, wherein the laser light supply system includes a plurality of lasers disposed on a common thermally conductive substrate, the plurality of lasers configured to respectively generate the plurality of wavelengths of continuous wave laser light.

6. The rack unit as recited in claim 5, wherein the laser light supply system is configured to allow for temperature-induced wavelength variation among the plurality of wavelengths of continuous wave laser light.

7. The rack unit as recited in claim 6, wherein the laser light supply system is configured to maintain relative wavelength spacings between the plurality of wavelengths of continuous wave laser light generated by the plurality of lasers.

8. The rack unit as recited in claim 1, wherein the laser light supply system is optically connected to the first optical transceiver through a first optical fiber and to the second optical transceiver through a second optical fiber.

9. The rack unit as recited in claim 8, wherein the laser light supply system includes an optical coupler network configured to combine the plurality of wavelengths of continuous wave laser light onto each of the first optical fiber and the second optical fiber.

* * * * *